Aug. 4, 1925. 1,548,669
L. G. DORSEY ET AL
SHOCK ABSORBER
Filed May 4, 1922 2 Sheets-Sheet 2
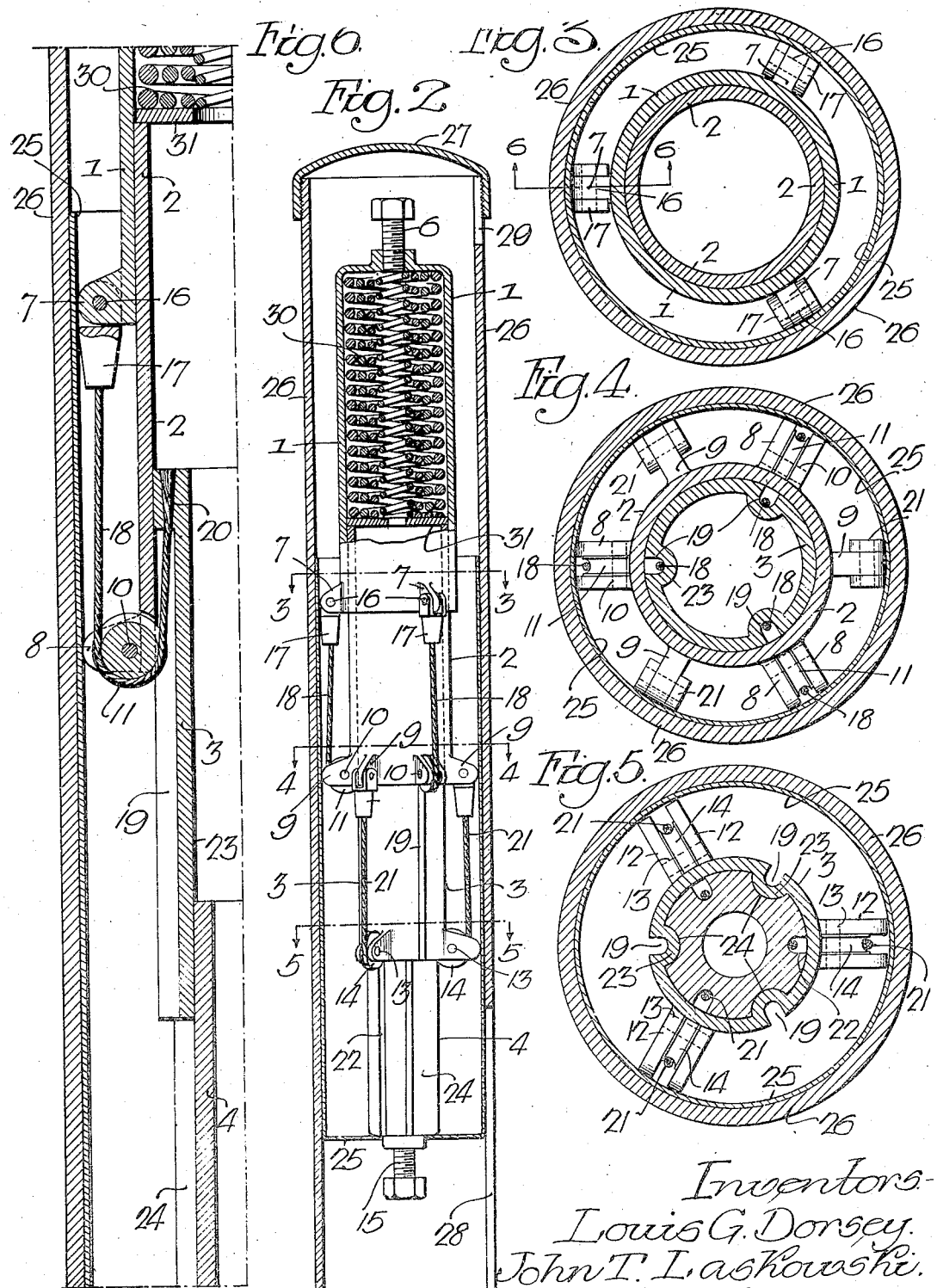
Inventors-
Louis G. Dorsey.
John T. Laskowski.
by their Attorneys
Howson & Howson.

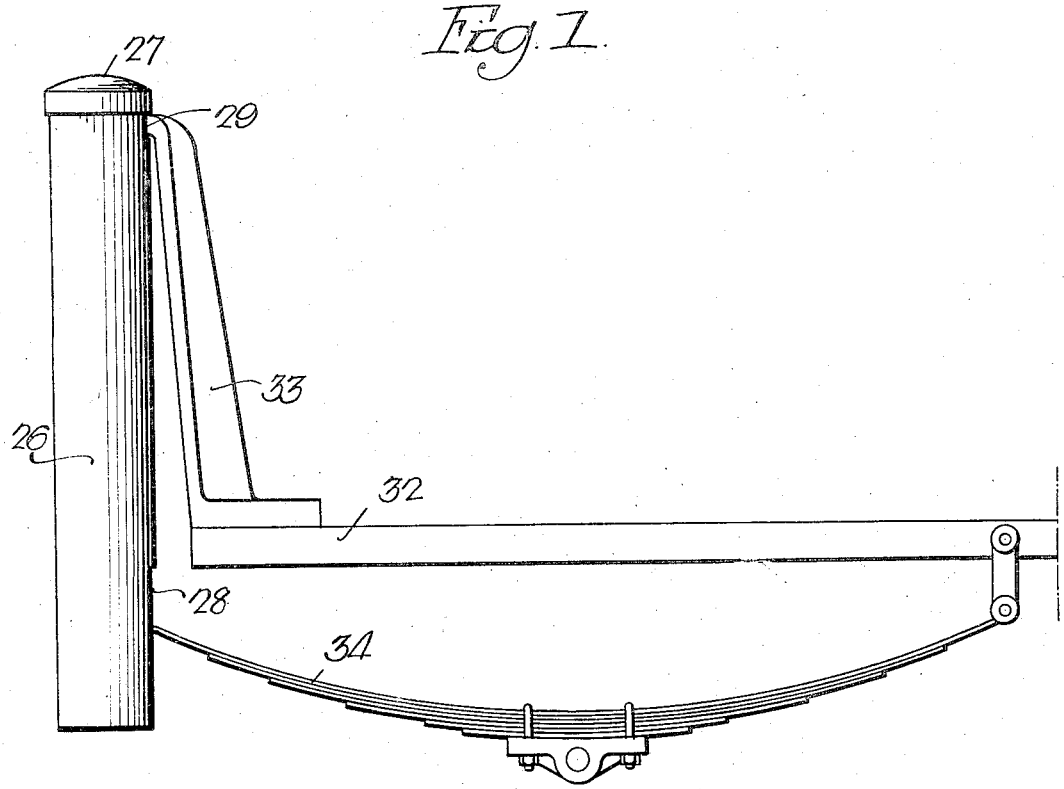

Patented Aug. 4, 1925.

1,548,669

UNITED STATES PATENT OFFICE.

LOUIS G. DORSEY AND JOHN T. LASKOWSKI, OF WILMINGTON, DELAWARE; SAID LASKOWSKI ASSIGNOR TO SAID DORSEY.

SHOCK ABSORBER.

Application filed May 4, 1922. Serial No. 558,402.

*To all whom it may concern:*

Be it known that we, LOUIS G. DORSEY and JOHN T. LASKOWSKI, citizens of the United States, residing in Wilmington, Delaware, have invented a Shock Absorber, of which the following is a specification.

This invention relates to shock absorbers of the type commonly employed on motor vehicles, and the object of the invention is to provide a shock absorber having the novel and improving features hereinafter described and illustrated in the attached drawings, in which:

Figure 1, is a fragmentary side elevation of a shock absorber made in accordance with our invention as applied to the rear of a motor vehicle;

Fig. 2, is a vertical section of the shock absorber detached from the vehicle;

Figs. 3, 4 and 5, are, respectively, transverse sections on the lines 3—3, 4—4 and 5—5, Fig. 2, and Fig. 6, is a fragmentary enlarged section on the line 6—6, Fig. 3.

With reference to the drawings, and particularly to Fig. 2 thereof, the shock absorber comprises in the present instance four cylindrical telescoping elements 1, 2, 3 and 4. As best shown in Figs. 2 and 3, the largest cylinder 1 has in the top thereof a tapped hole for the reception of a bolt 6, the function of which will be described hereinafter, said element also having at the lower edge and extending laterally therefrom three evenly spaced and perforated radial lugs 7.

Fitting neatly within the cylinder 1 is the open-ended cylinder 2, which cylinder, as best shown in Figs. 2, 3 and 6, is provided at its lower end with three evenly spaced and substantially radial pairs of lugs 8, 8, and also with an evenly spaced series of radial lugs 9, which latter lugs alternate with the pairs of lugs 8, 8. The lugs 8, 8, are perforated for the reception of pins 10, upon which are mounted between the respective pairs of lugs sheaves 11.

Fitting neatly within the cylinder 2 is the cylinder 3, this cylinder being provided at its lower end with evenly spaced pairs of substantially radial lugs 12, 12, which are perforated similar to the pairs of lugs 8, 8, of the cylinder 2 for the reception of pins 13, upon which are mounted sheaves 14. The lower closed end of the cylinder 4 has therein a tapped hole for the reception of a bolt 15, the function of which will be described hereinafter.

To each of the lugs 7 of the cylinder 1 is pivotally attached by means of pins 16 and end fixtures 17 of well known form, a flexible connector 18, said connectors being adapted to pass over the respective sheaves 11 of the cylinder 2, as best shown in Fig. 6, and to have their inner ends suitably secured at the top of the cylinder 3. There are provided in the periphery of the cylinder 3 longitudinal recesses 19 extending from the bottom to a point near the top of the cylinder, and from the top of each recess and extending through to the top side of the cylinder is an opening 20 which flares from the bottom end thereof to the top of the cylinder, this flared opening being provided for the reception of the inner end of the flexible connector 18, which is inserted and secured in the said opening in well known manner. As clearly shown in Fig. 6, the recesses 19 not only provide a space for the flexible connector 18 but also for the inner edge of the sheave 11.

Flexible connectors 21 are secured in similar manner to the lugs 9 of the cylinder 2 and extend over the sheaves 14 of the cylinder 3, and are connected in the manner previously described to the upper end of the cylinder 4, the cylinder 4 being provided with longitudinal grooves 22 for the reception of the said flexible connectors 21. Also as shown in Figs. 4 and 5, the cylinder 3 is provided on its inner surface with longitudinal elevations or ridges 23, corresponding longitudinal grooves 24 being provided in the periphery of the cylinder 4 whereby relative movement of the cylinders 3 and 4 is prevented. An open-top lubricant-containing casing 25 is secured to the bottom of the cylinder 4 and extends upwardly approximately to the bottom of the cylinder 1, said casing 25 telescoping an outer casing 26 open at the bottom and provided at the top with a screw cap 27. This latter casing has at the bottom a longitudinal slot 28 and at the top an opening 29, the purpose of which will hereinafter be described.

As shown in Fig. 2, there is established in the upper cylinder 1 a set, in the present instance, of springs 30, 30, a washer 31 being provided for the lower seat and as a bearing for the upper end of the cylinder 2. It will be noted that by reason of the telescoping cylinder construction and the flexible connectors, any movement of the cylinder 4 is reduced four times in the resultant movement of the cylinder 2. Thus for instance if the movement of the cylinder 4 is eight inches, the movement of the cylinder 3 will be four, and movement in the cylinder 2 will be reduced to two inches. The thrust upon the multiple springs in the top of the cylinder 1 will be accordingly four times as great as the original thrust upon the cylinder 4, and as a result comparatively heavy springs may be employed with no sacrifice of the shock absorbing qualities of the shock absorber. At each movement of the elements of the shock absorber, the lubricant in the casing 25 is brought into contact with the flexible connectors and the sheaves, keeping these elements thoroughly lubricated and reducing the wear to a minimum.

The shock absorber may be attached to a vehicle in the manner shown in Fig. 1, in which the reference numeral 32 designates the rear end of the main frame of the motor vehicle, there being provided at the rear end of this frame and one at each side an upstanding bracket 33, the end of which turns rearwardly and is adapted to pass through the aperture 29 in the outer casing 26, the cylinder 1 being secured to the end of this bracket member by means of the bolt 6 which passes therethrough. The lower end of the cylinder 4 is similarly secured by means of the bolt 15 to the rear end of the spring 34, which spring passes through the slot 28.

It will be noted that the resistance of the springs to relative movement of the cylinders is assisted by the compression of the air in the cylinders when the latter are forced together, this air cushioning effect prohibiting a complete and sudden compression of the springs under excessive shock and assisting materially in the shock absorbing characteristics of the device.

We claim:

1. In a shock absorber, the combination with an impulse-receiving element, of cushioning means opposing movement of said element, elements interposed between the receiving element and the resilient means, and means for reducing the movement of the receiving element continuously and in substantially uniform increments through the intermediate elements toward the cushioning means.

2. In a shock absorber, the combination with an impulse-receiving element, of resilient means opposing movement of said element, and a plurality of elements associated with the receiving element and with the resilient means and adapted to diminish the movement of the receiving element continuously and in substantially uniform increments in transmitting it to the resilient means.

3. In a shock absorber, the combination with a plurality of telescoping cylinders, of a spring adapted to oppose telescoping movement of the cylinders, and means connecting the various cylinders whereby movement of the smallest cylinder effects a diminished movement of the larger cylinders.

4. In a shock absorber, the combination with a plurality of telescoping cylinders, of means connecting said cylinders whereby inward movement of the smallest cylinder creates a corresponding and progressively smaller movement in the cylinders intermediate the smallest and largest cylinders, and resilient means opposing the movement of the lesser cylinders.

5. In a shock absorber, the combination with a plurality of telescoping cylinders, sheaves at the exposed end of the intermediate cylinder, flexible connectors attached to the largest cylinder and to the inner end of the smallest cylinder and passing over said sheaves, and resilient means opposing inward telescoping movement of the cylinders.

6. In a shock absorber, the combination with a plurality of telescoping elements so connected that movement of one end element effects a progressively lesser movement of the others, resilient means opposing movement of said elements, and a lubricant-containing casing surrounding and movable with said elements.

7. In a shock absorber, the combination with cushioning means adapted for mounting between relatively movable members, of means including a plurality of telescoping elements having relatively non-resilient interconnection for transmitting said relative movement to the cushioning means and for modifying said movement in transmission.

8. In a shock absorber, the combination with at least three telescoping elements so interconnected that movement of the smallest element effects a progressively lesser movement of the others, and a spring in the largest of said elements constituting sole means for opposing the telescoping movement of all of the elements.

9. In a shock absorber, the combination with at least three elements so interconnected that movement of an end element effects a progressively modified movement of the others, and a single resilient means engaging one of the end elements and opposing movement in one direction of all the elements.

LOUIS G. DORSEY.
JOHN T. LASKOWSKI.